(12) United States Patent
Jensen

(10) Patent No.: US 8,600,152 B2
(45) Date of Patent: Dec. 3, 2013

(54) DEVICES, SYSTEMS AND METHODS FOR TRANSCRIPTION SUGGESTIONS AND COMPLETIONS

(75) Inventor: Lee Samuel Jensen, Provo, UT (US)

(73) Assignee: Ancestry.com Operations Inc., Provo, UT (US)

( * ) Notice: Subject to any disclaimer, the term of this patent is extended or adjusted under 35 U.S.C. 154(b) by 1001 days.

(21) Appl. No.: 12/605,999

(22) Filed: Oct. 26, 2009

(65) Prior Publication Data

US 2011/0096983 A1    Apr. 28, 2011

(51) Int. Cl.
*G06K 9/62*    (2006.01)
*G06K 9/18*    (2006.01)
*G06K 9/00*    (2006.01)

(52) U.S. Cl.
USPC ............................ 382/161; 382/187; 382/186

(58) Field of Classification Search
None
See application file for complete search history.

(56) References Cited

U.S. PATENT DOCUMENTS

| | | | |
|---|---|---|---|
| 6,269,188 B1 * | 7/2001 | Jamali | 382/229 |
| 6,424,983 B1 * | 7/2002 | Schabes et al. | 715/257 |
| 6,501,855 B1 * | 12/2002 | Zelinski | 382/186 |
| 7,181,471 B1 | 2/2007 | Ibuki et al. | |
| 7,350,101 B1 | 3/2008 | Nguyen et al. | |
| 7,783,565 B1 | 8/2010 | Ajose et al. | |
| 8,315,484 B2 * | 11/2012 | Meyer et al. | 382/310 |
| 2003/0177115 A1 * | 9/2003 | Stern et al. | 707/4 |
| 2004/0064454 A1 | 4/2004 | Ross et al. | |
| 2005/0147947 A1 | 7/2005 | Cookson, Jr. et al. | |
| 2008/0059408 A1 | 3/2008 | Barsness et al. | |
| 2009/0281978 A1 | 11/2009 | Gordon et al. | |
| 2010/0005078 A1 | 1/2010 | Bayliss | |

OTHER PUBLICATIONS

NPL—Miller, Immigrant Origins (url: http://philgen.org).*
NPL—Wendy Post—Reconstructing the Extended Kin-network in the Netherlands with Genealogical Data: Methods, Problems, and Results, published 1997.*
NPL. Luis von Ahn et al. "reCAPTCHA: Human-Based Character Recognition via Web Security Measures", Sep. 2008.*

* cited by examiner

*Primary Examiner* — Chan S Park
*Assistant Examiner* — Ha Le
(74) *Attorney, Agent, or Firm* — Kilpatrick Townsend & Stockton LLP

(57) ABSTRACT

Methods, devices and systems are described for transcribing text from artifacts to electronic files. A computer system is provided, wherein the computer system comprises a computer-readable storage device. An image of the artifact is received wherein text is present on the artifact. A first portion of the text is analyzed. Characters representing the first portion of the text are identified at a first confidence level equal to or greater than a threshold confidence level. The characters representing the first portion of the text are stored. A second portion of the text appearing on the artifact is analyzed. A plurality of candidates to represent the second portion of the text are identified at a second confidence level below the threshold confidence level. Finally, the plurality of candidates to a user for selection are presented.

17 Claims, 5 Drawing Sheets

DEVICES, SYSTEMS AND METHODS FOR TRANSCRIPTION SUGGESTIONS AND COMPLETIONS

BACKGROUND OF THE INVENTION

Over the past several decades, a large percentage of documents have been created and stored in digital formats. However, during this same time period and earlier, massive volumes of information have been recorded and stored only on physical documents. Such physical documents may include items that were produced using a computer or word processor and were printed, with the associated electronic files no longer available. Such physical documents may also include documents produced using a typewriter, with no associated electronic file ever created. Still further, massive amounts of handwritten records, spanning centuries, may exist.

While many of these documents are decades, if not centuries, old, each may contain information that would be beneficial to be available in an electronic and searchable format. One possible example may include previous population, birth, and death records. Such information may be particularly useful for a genealogist attempting to reconstruct a family tree with members throughout the country or world. In so doing, it may be useful to have access to immigration records, census records, birth certificates, death certificates, and/or any other document that may accurately provide information relating to family structures. Assisting genealogic studies is just one of the near limitless examples of the benefits of digitizing physical documents into an electronic, searchable format.

While digitizing documents previously unavailable in an electronic format may have distinct advantages, several obstacles exist. For example, consider FIG. 1. FIG. 1 illustrates a population schedule 100 from the 1930 Census of the United States. As illustrated, this is one page representing partial population information for Allegheny County of Pennsylvania. Considering that the 1930 Census was the 15th census of the United States, and each census has been charged with documenting every person in the country, the volumes of data existing in censuses in the United States alone are enormous.

While computer software and hardware arrangements capable of scanning and digitizing some text (often referred to as optical character recognition ("OCR")) appearing on physical documents exist, they may have several drawbacks. In many instances they may not be able to produce with sufficient accuracy digitized text representing the text on the physical document. This may be due to one or more different problems. For example, the typing or penmanship may be fully or partially illegible, such as a name 110 in FIG. 1. Corrections or cross-outs, such as correction 120 may exist. Further, scanning errors or document imperfections may exist, such as anomaly 130. Such problems affect the ability of a machine to accurately decipher printed or handwritten text (which may not be decipherable by OCR at all), may prevent the automatic digitization of records, thereby requiring a person to manually review, decipher, and input the correct characters associated with the problem text. Considering the volumes of data, the possibility of frequent problem text appearing on documents, and the resources (especially in terms of a human workforce) required to produce accurate digitized data may be enormous, costly, and time-consuming.

The following invention serves to remedy these and other problems.

BRIEF SUMMARY OF THE INVENTION

Devices, systems, and methods are described for a novel architecture of digitizing text from documents to electronic files.

In some embodiments of the invention, a computer system may be used to analyze an image of a physical document. Text appearing in the image of the physical document that is recognized at or above a threshold confidence level may be considered to be correct, and is used to create an electronic file that is a digitized version of the physical document. Possibly in the same document, text that is not recognized at or above a threshold confidence level may have several candidate text strings identified as possible correct representations of the questionable text. The candidates may then be presented to a user, along with the original text, to allow the user to select the candidate that appears to most accurately represent the original text. The user may also have an option of manually entering text if no candidate appears to be correct.

In some embodiments of the invention, the computer system used to analyze the image of the physical document has access to a database of related information or records. Such a database may allow the computer system to increase its confidence level in determining the text appearing in the image of the physical document, thereby either eliminating the need to present candidate strings of text to a user or producing more accurate candidate strings of text for the user. Such a database may include information, data, and/or records from similar categories of data or subcategories of data as the physical document. For example, if a piece of text on a birth record for a person is unreadable, a database record for the same person may be accessed in an attempt to identify the unreadable text.

In some embodiments, a method for transcribing text from an artifact to an electronic file may be described. The method may include providing a computer system, wherein the computer system comprises a computer-readable storage device. The method may also include receiving, at the computer system, an image of the artifact, wherein text is present on the artifact. The method may further include analyzing, at the computer system, a first portion of the text. The method may include identifying, at the computer system, at a first confidence level equal to or greater than a threshold confidence level, characters representing the first portion of the text. Also, the method may include storing, at the computer-readable storage device, the characters representing the first portion of the text. The method may further include analyzing, at the computer system, a second portion of the text appearing on the artifact. The method may include identifying, at the computer system, at a second confidence level below the threshold confidence level, a plurality of candidates to represent the second portion of the text. Finally, the method may include presenting, at the computer system, the plurality of candidates to a user for selection.

In some embodiments, the method may also include receiving, at the computer system, from the user, a selection of one of the plurality of candidates to represent the second portion of the text, and may also include storing, at the computer-readable storage device, the selection. In some embodiments, the method may further include creating, at the computer system, the electronic file comprising the digital characters representing the first portion of the text and the selection. In some embodiments, the method may include providing, at the computer system, a similar content database, wherein the similar content database comprises a plurality of records comprised of information from other artifacts; and determining, at the computer system, that the artifact is related to a record of the plurality of records.

In some embodiments, a method for transcribing text from a physical document to an electronic document is described. The method may include providing a computer system, wherein the computer system comprises a computer-readable storage device and a user display; receiving, at the computer system, an image of the physical document, wherein the image comprises imaged text; and identifying, at the computer system, a plurality of candidate strings of electronic text to represent portions of the imaged text. The method may also include presenting, at the computer system, via the user display, the plurality of candidate strings of electronic text and the portion of the text to a user; receiving, at the computer system, a selection of one of the candidate strings of digitized text from the user; and creating, at the computer system, an electronic document comprising the selection of one of the candidate strings of electronic text from the user.

In some embodiments, the method also includes providing, at the computer system, a database, wherein the database comprises electronic text transcribed from physical documents. The method may also include determining, at the computer system, a link between at least one record of the database and the physical document; and matching, at the computer system, at least a portion of the at least one record to a portion of imaged text of the physical document.

In some embodiments, the method may also include identifying, at the computer system, a string of digitized text to represent a portion of the text. The method may further include determining, at the computer system, a confidence level of the string of text; comparing, at the computer system, the confidence level to a threshold confidence level; determining, at the computer system, the confidence level meets or exceeds the threshold confidence level; and storing, at the computer system, the string of text as part of the electronic document.

In still other embodiments, a computer-readable storage medium having a computer-readable program embodied therein for directing operation of a computer system may be described. It may include a processor and a storage device, wherein the computer-readable program includes instructions for operation of a computer system to transcribe text appearing in imaged documents to an electronic file. The instructions may include receiving an image of a document, wherein text appears on the document. The instructions may also include analyzing the text appearing in the image of the document; identifying questionable text, wherein the questionable text is identified at a confidence level less than a threshold confidence level; determining a related record stored in a database, wherein the database comprises related records; and analyzing the related record to identify a string of candidate text as a replacement for at least a portion of the questionable text. The method may also include presenting the at least one string of candidate text as a choice for replacement of the questionable text to a user; receiving a selection of the choice for replacement from the user; replacing the unidentified text with the string of candidate text; and storing the string of candidate text in a digitized document.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a second label that distinguishes among the similar components.

DETAILED DESCRIPTION OF THE INVENTION

Figure 1:
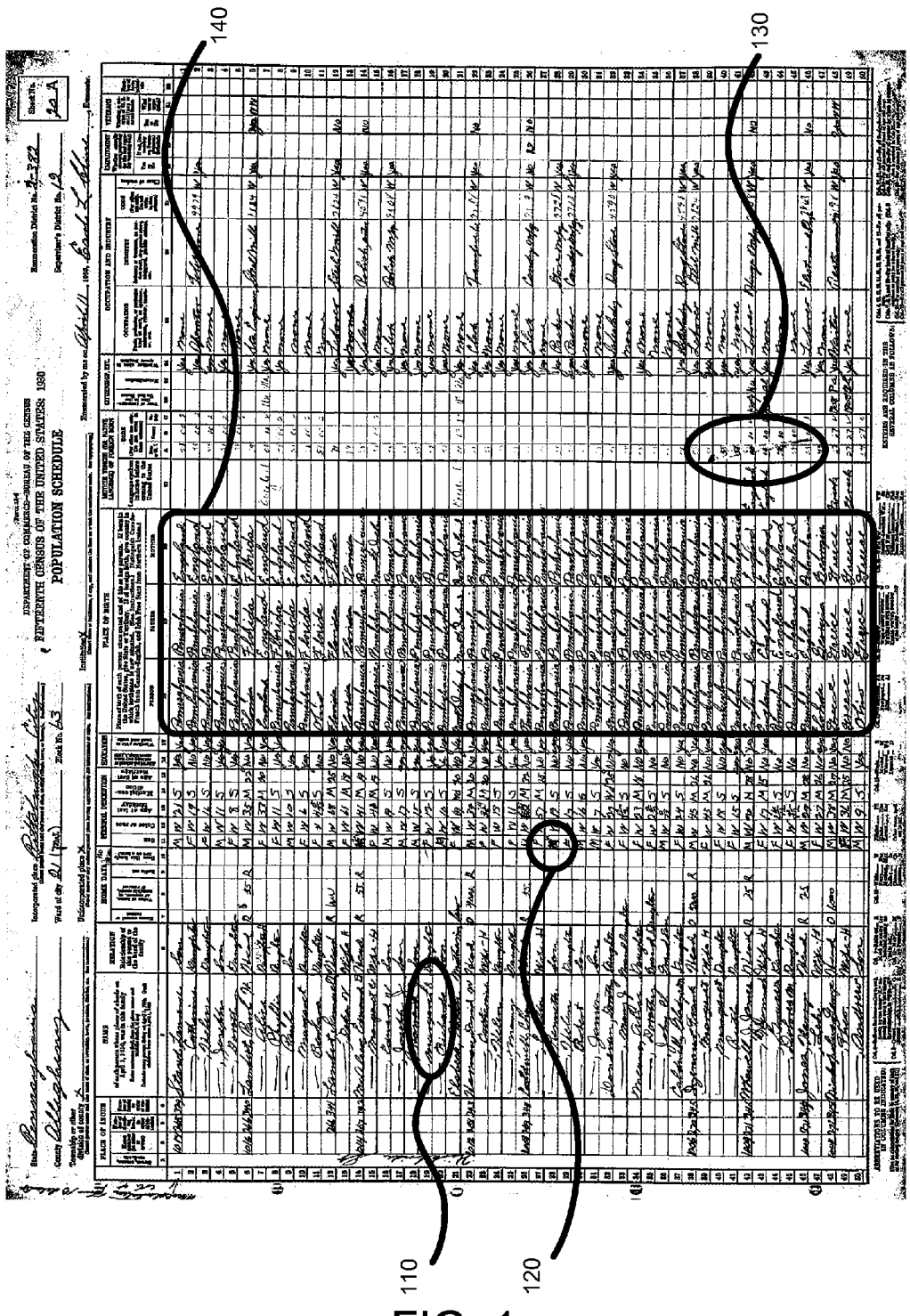
FIG. 1 is an image of one page of a population schedule from the 1930 United States Census illustrating several instances of problem text.

While various aspects and features of certain embodiments have been summarized above, the following detailed description illustrates a few exemplary embodiments in further detail to enable one of skill in the art to practice such embodiments. In the following description, for the purposes of explanation, numerous specific details are set forth in order to provide a thorough understanding of the described embodiments. It will be apparent, however, to one skilled in the art that other embodiments of the present invention may be practiced without some of these specific details. In other instances, well-known structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

A set of embodiments provide solutions (including without limitation, devices, systems, methods, software programs, and the like) for transcribing images of documents containing text to electronic files. In some embodiments, a computer system receives and analyzes an image of a physical document. Text that is identified at or above a threshold confidence level may be considered to be correct, and may be used to create an electronic file that is a digitized version (possibly of only the text) of the physical document. Within the same or different document, text that is not recognized at or above a threshold confidence level may have several candidate characters or strings of characters (for simplicity, collectively referred to as "characters") identified as possible correct transcriptions. The candidates may then be presented to a user, along with an image of the physical document, to allow the user to select the candidate that appears to most accurately represent the original text. The user may also have an option of manually entering text if no candidate characters appear to be correct.

In some embodiments of the invention, the computer system used to analyze the image of the physical document has access to a database of related information or related records. Such a database may allow the computer system to increase its confidence in determining the correct transcription of text appearing in the image of the physical document, thereby either eliminating the need to present candidate characters to a user or producing more accurate candidate strings of text for the user. Such a database may include information, data, and/or records from documents containing similar data as the physical document.

By way of example only, if a physical document being digitized is a census document for a particular person, and a computer system performing OCR cannot determine with a sufficient confidence level the content of problem text on the physical document, the computer system may access a database and review other census data for the correct string of text. For example, if a birth date is unreadable on the 1950 census record of John Adams of Quincy, Mass., the computer may access a record containing the 1940 census record of John Adams of Quincy, Mass. Based upon birthdate information present in the latter record, which may have been previously digitized or entered into the database by other means, the computer system may be able to determine the birthdate on the 1950 census record with a higher confidence level, either sufficient enough to enter the birthdate into an output digitized electronic document (without user input), or present more accurate candidates for selection to a user.

Figure 2:
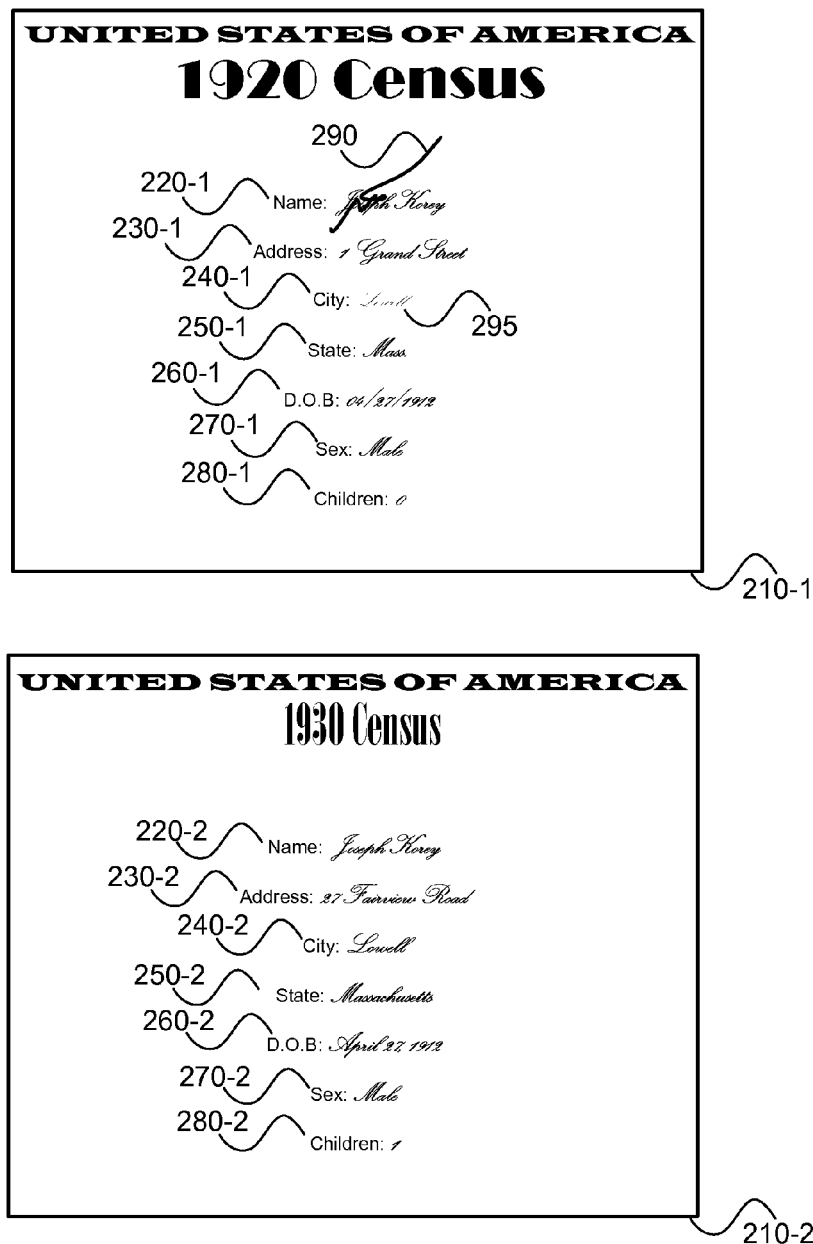
FIG. 2 is a simplified embodiment of two images of records for digitization.

FIG. 2 is a simplified illustration of multiple related images of physical documents 200 that may be digitized by a computer system. FIG. 2 illustrates images of two census records 210, census record 210-1 is from the 1920 United States Census, while census record 210-2 is from the 1930 United States Census. Each contain similar datafields: name 220, address 230, city 240, state 250, date of birth (D.O.B.) 260, sex 270, and children 280. The census records 210 belong to the same person, named Joseph Korey. On census record 210-1, several imperfections exist that may impact the ability of the information contained therein from being successfully recognized by a computer system performing OCR and digitized into an electronic File.

Anomaly 290 partially obscures Mr. Korey's first name. Anomaly 290 may represent many possible imperfections. It may represent a hair or dust that was present when the image of census record 210-1 was scanned or imaged. It may also represent a stray scribble or imperfection on the actual census record 210-1. Whatever the source, it may lower the ability of a computer system digitizing physical documents to determine Mr. Korey's first name with a high confidence level. In census record 210-1, the name of the city 295, Lowell, also may be difficult to determine. The printing of the name of the city 295 may appear lighter due to scanning techniques, the author's penmanship or other printing of some other device (such as a typewriter), and/or imperfections in census record 210-1. Again, whatever the source, this imperfection may lower the ability of a computer system digitizing physical documents to determine the name of the city 295 with a high confidence level.

In addition to analyzing the text present on the census record 210-1, the computer system may have the ability to access other records that have been previously digitized or otherwise made available, possibly via a database, to the computer system performing the digitization of census record 210-1. Census record 210-2, from the 1930 United States Census, represents another record for Mr. Korey. However, in this record 210-2, some of his information has changed. Assuming he truthfully provided information, his address, as present in field 230 has changed. Also, while the state of his residence 250 has remained unchanged, the format in which he wrote the information has changed (from Mass. to Massachusetts). Likewise, while his birthdate 260 has remained unchanged, the format in which the information was supplied changed (from "month/day/year" to "month day, year"). Likewise, the number of children 280 has changed between Mr. Korey providing information for census record 210-1 and census record 210-2.

Despite these changes, if census record 210-2 is present in a related record database, it may assist the computer system in determining the first name obscured by anomaly 290 and the partially illegible city name 295. For example, the computer system may be able to search the database for the last name Korey (which it may have been able to decipher with a high degree of confidence), and the date of birth 260 (which the computer system may be able to recognize in a variety of formats). From this search, it may determine that a man with the last name of Korey was born on the same day, having the first name "Joseph." Based on this, the computer system may be able to determine with a higher level of confidence the first name obscured by anomaly 290. The computer system may automatically use "Joseph" as Mr. Korey's first name, or may present to a user "Joseph" as a candidate to select. The presence of some different information, such as different addresses 230, and number of children 280, may affect the confidence level in which the computer system determines Mr. Korey's first name to be "Joseph," or it may be ignored because of consistency in his last name, date of birth 260, state 250, and sex 270.

A similar process may be followed for identifying the city name 295 of census record 210-1. Based upon the other information that may be determined with a high level of confidence from census record 210-1, the computer system may be able to access a related record database and identify a record or other information on Joseph Korey that would increase the confidence level with which the computer system may determine the name of city 240-1. While the above example discusses the comparison of two census records 210, those with skill in the art will recognize that records may be cross referenced with different categories of records that may contain similar information (such as census records with birth certificates or voter registration lists). Further, a record may be cross referenced with multiple other records.

Further, the database may contain a conglomeration of data collected from multiple documents. For example, as opposed to containing discrete records, such as a birth certificate and census record for "Joseph Korey," a record may exist for Mr. Korey that contains data compiled from multiple sources, such as a birth date and city of residence from a voter roll, with the names of his children added from a census record.

Figure 3:
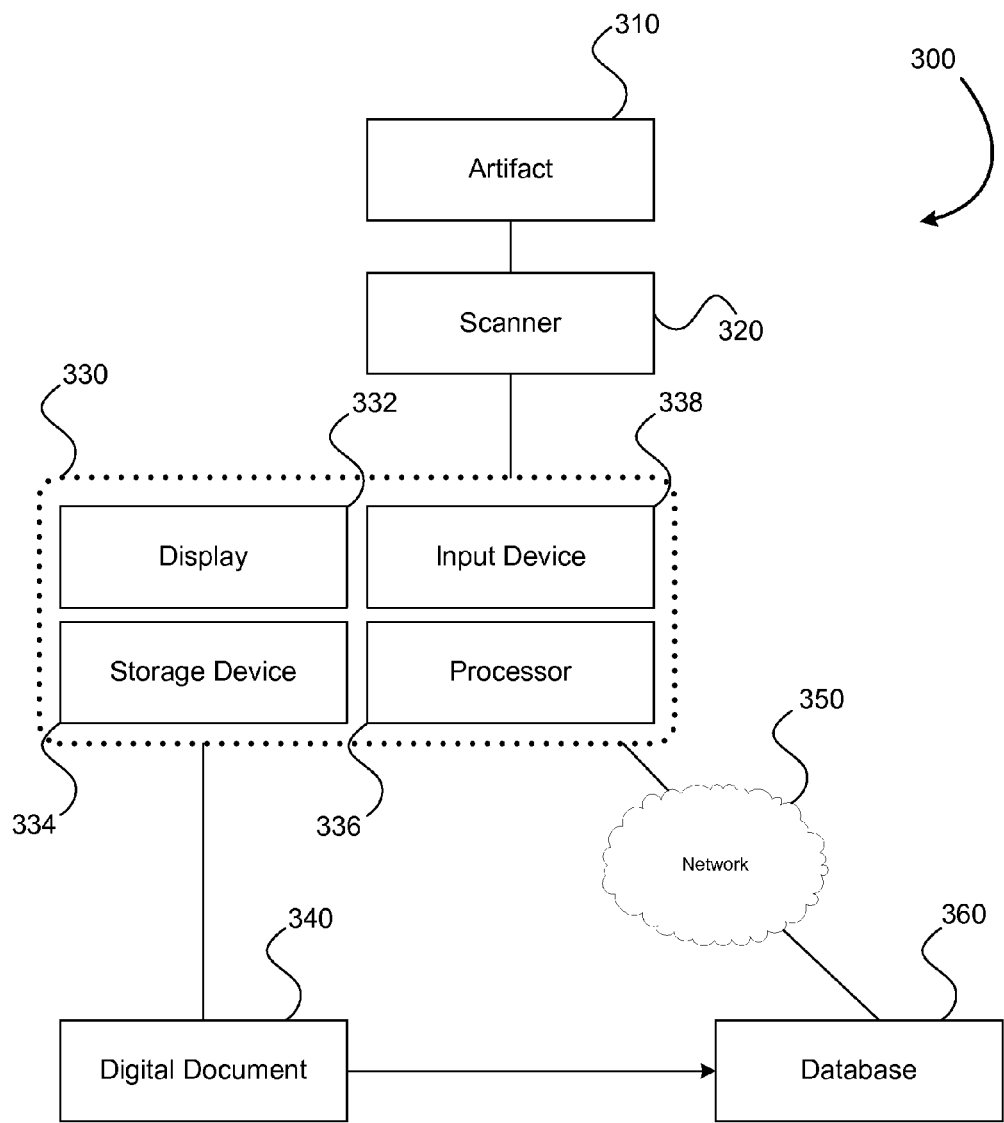
FIG. 3 is a simplified block diagram of an embodiment of a system for digitizing physical documents.

An analysis of multiple records, such as that conducted on census records of Mr. Korey, may be completed by a computer system such as the embodiment illustrated in FIG. 3. FIG. 3 is a simplified block diagram of an embodiment of a system 300 for digitizing physical documents. Such a system 300 may include: a scanner 320, a computer system 330 (including a display 332, a storage device 334, and a processor 336) and a database 360 which may be accessed over a network 350. In such a system, an artifact 310 may be scanned using scanner 320. The artifact may be a document, or any other item having text printed thereon. As those with skill in the art will recognize, artifact 310 may belong to innumerable categories of documents, such as voter records, military records, immigration records, census records, books, timesheets, journals, diaries, birth certificates, death certificates, social security records, welfare records, bank account records, and telegraph records, to name only a few examples.

An image of artifact 310 may be generated. Such an image may be created using a scanner 320, such as a handheld scanner or a flatbed scanner. In some embodiments, a video or picture device, such as a camera, is used to generate the image of the artifact 310.

The computer system 330 may be a server-based system, or may be a desktop-based system. In some embodiments, a human user may interact with the computer system using an input device 338 and the display 332, such as a computer screen. The computer system 330 may receive images from the scanner 320 directly, or may receive the images via a network or other distribution method, such as a portable computer-readable storage device, which may be a flashdrive or DVD. The computer system may have a storage device 334.

Such a storage device may be a hard drive, flash drive, memory, and/or any other device capable of storing digital data. The computer system 330 may access the database 360 directly. For example, the database 360 may reside on the storage device 334 of computer system 330. Alternatively, the database may reside at another computer, a server (or another server) and be accessible by multiple computers. The database 360 may be accessed via a network 350. The network may be public, such as the Internet, or private, such as a private intranet.

The computer system 330, upon receiving an image from scanner 320, may analyze the image for text. The computer system 330 may digitize the text and create a digital document 340. Alternatively, due to handwriting or some other variable which makes digitization of the text impractical, the text may be typed manually by a person. The creation of the digital document 340 may contain the same or similar information to what was present in text on the artifact 310. The creation of the digital document may or may not involve interaction from a user. The computer system 330 may create digital documents 340 as the images are received from the scanner 320, or the images from the scanner may be stored, such as at the storage device 334 of the computer system 330, and transcribed at a later time or possibly in a batch process transcribing many images of artifacts.

A digital document 340 may be added to the database 360. In some embodiments, only the information present in a digital document 140 is added to the database 160. Therefore, as more artifacts are scanned, and the number of digital documents produced increases, the number of documents stored within the database 360 may increase. As the database 360 grows with the addition of more digital documents 340 (or information collected from the digital documents), the amount of data available to reconstruct other artifacts may grow.

As those with skill in the art will recognize, the database 360 may be organized and used in many different ways to find records associated with the digitized document. From the entire set of possible records contained in the database, a set of candidates of related records may be produced. To arrive at the set of candidates, standard information retrieval algorithms may be employed using set mathematics and the union of all possible terms represented by the data field in question. Matching records may be ordered according to the number and/or proximity of matching terms. There may be an arbitrary cut off of the number of records that are returned in this related record set.

In some embodiments, a further analysis of the records represented by the candidate set is then conducted. While the application of such a database system may be applied to any information, in keeping with the census example, a method of evaluating records relating to persons will be discussed. In some embodiments, a first comparison is done based on the name of the person associated with a record in the database. This may involve a comparison of the person's given name, then of the person's surname. The names may be compared based on the number of terms (characters) and/or whether the names are exact matches. Further, other matching techniques may be used, including a jaro/winkler comparison (which determines the similarity of two strings) cross matching (returning a possible match if names are switched, such as a person's first and middle name), phonetic (transducer) comparison (such as names that sound alike), a typographical comparison, a backward comparison (such as if a last name listed first), subset matching (a possible match may be detected if a name is a subset of some other name, for example "Will" is a subset of "William") and/or initial matching.

Other properties of the given and surname may also be compared, including the number of initials, the term length, the name's cultural origin, nicknames, title, prefix, suffix, and/or probability of being a match. Also, a name dictionary may be used.

A second comparison may look at the birthdate of the person associated with the record in question and records from the related record set in the database. The whole birthdate event may be matched (including the day, month, and year) or may be partially matched (such as just the month and day). The birthdate may be compared based on the year, month, day, distance (amount of time between the dates being compared), and/or probability of being a match. The place of birth may also be compared. This may include comparing attributes such as: country, state, county, and city. These attributes may also be determined using probability of match, adjacency, historical matches (e.g., a place changes name), typographical similarities to other places, phonetic similarities to other places, and distance to other places.

Other comparisons may include a place of death and a place of residence. Both of these comparisons may involve a similar comparison as with the place of birth. The lifespan of persons in each record may also be compared, this may involve some inferences made based upon marriage records, birth records, death records, residence records and/or the overlap of life spans. A comparison of records may look for an exact match in gender. The authority of a source may be analyzed (for example, factors that may fall under this category include whether the source is usually correct, the authority responsible for the source, etc.). Similarly, the completeness of a source may be factored into the comparison to the values present in the database.

Records within a family may also be compared. The comparison may look "up" for attributes relevant to the record in question. This look "up" refers to looking at the person's parents and siblings. The comparison may look "down" for related attributes. This look "down" refers to looking at the person's spouse (possibly including the spouses mother and/or father), marriage, and children. Certain information regarding family members may be inconclusive for matching purposes (for example, the number of children may change over time). Such information may only be used if a match is made; and may be ignored otherwise.

Based upon the results of the individual attributes (those related only to the person associated with the record in question, e.g. birthdate, name, etc) and the family attributes (those related to other family members, both "up" and "down") may be combined to create a single score may be created. This score may influence how likely candidates identified from the database are likely to be correct determinations of missing data.

Figure 4:
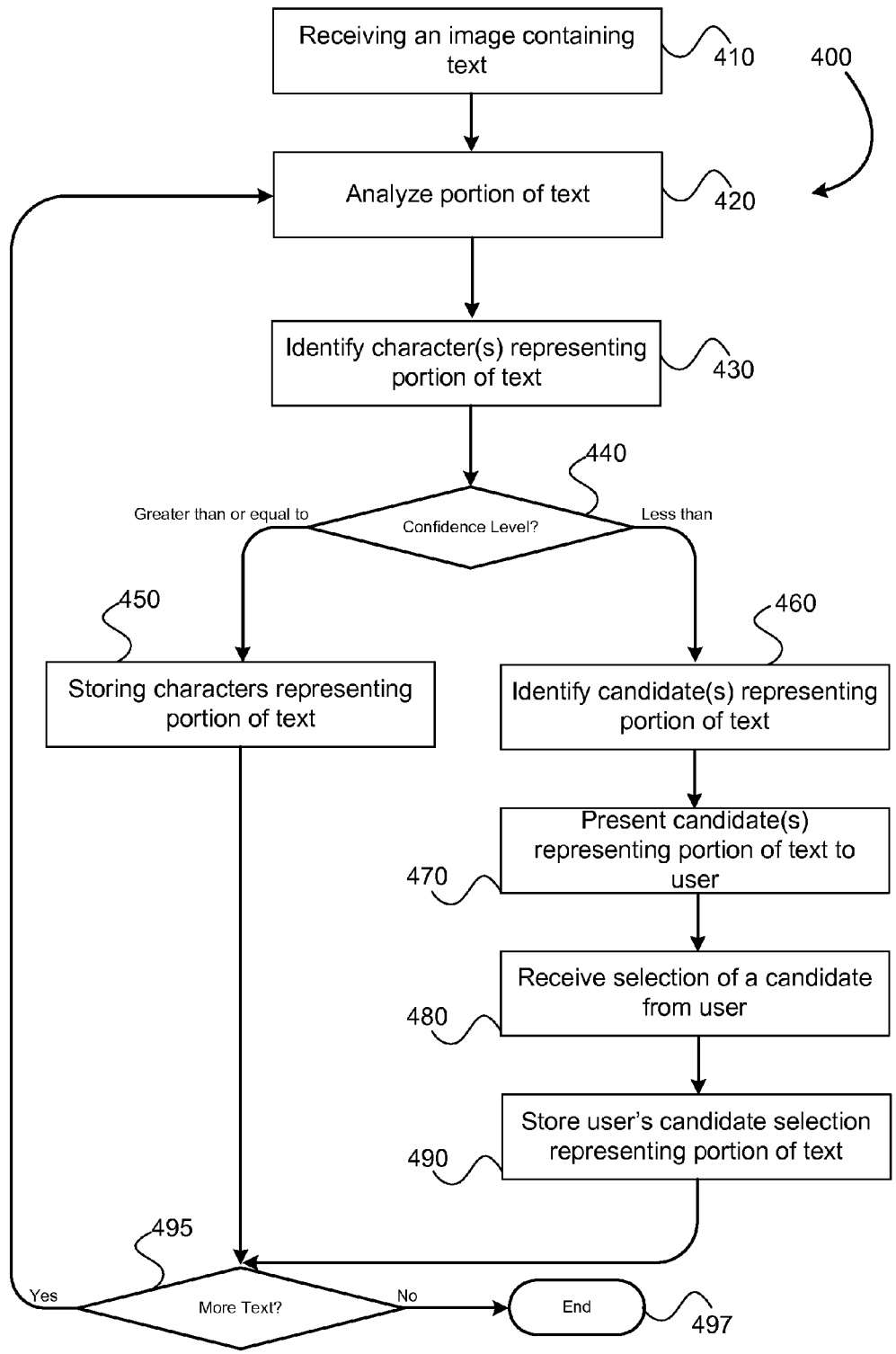
FIG. 4 is a simplified block diagram of an embodiment of a method for digitizing physical documents.

System 300 of FIG. 3 may be used to perform various methods of digitizing documents. FIG. 4 is a simplified block diagram of an embodiment of a method 400 for digitizing physical documents that may be implemented using system 300 or some other computer system. At block 410, an image may be received that contains text. Such an image may be received at a computer system, such as the computer of system 300 of FIG. 3, or possibly some other computer system. The image may be generated by an imaging device, such as a scanner or camera.

After receiving the image that may contain text, the image may be stored for a period of time. At block 420, a portion of the text appearing in the image may be analyzed. Analysis of the text may involve varying sized strings of text being analyzed individually. For example, each character (being a letter, a number, or a symbol) may be analyzed separately.

Alternatively, the portion of text analyzed may be a word, sentence, line, paragraph, or page. Such an analysis may involve using specialized software capable of optical character recognition.

The analysis of a portion of the text at block 420 may result in one or more digital characters being determined to represent the portion of the text at block 430. For example, if the analysis was conducted on one character of text, one digital character may be determined at block 430. If the analysis was conducted on a word of text, a string of digital characters may be determined to represent the word at block 430. Additionally, a confidence level may be determined. The confidence level may represent the probability that a digital character or string of digital characters identified at block 430 is the correct digital character or string of digital characters to represent the corresponding character appearing in the image. By way of example only, the confidence level may be measured on a scale of 1 to 100. Anytime a confidence level is determined over a certain threshold confidence level on the scale, it may be assumed that the digital character or string of digital characters is correct. For example, a threshold confidence level may be 95. A lower threshold confidence level, such as 85, may yield more digital characters or strings of digital characters that are deemed "correct;" however, the number of errors being introduced to the final output may be increased.

Cross-outs, poor handwriting, and other anomalies, such as those described with relation to FIG. 1 and FIG. 2 may significantly affect confidence levels for particular words or letters. For example, the confidence level determined for the majority of text on a page may be high, except for a string of characters or single character. An anomaly, such as 290 of FIG. 2, may result in a very low confidence level for the digital characters determined to represent the obscured character or string of characters.

At block 440, the confidence level of the digital character or string of digital characters identified at block 430 may be compared to the threshold confidence value. Such a threshold confidence value may be set and/or adjusted by a user. In some embodiments, the threshold confidence value is adjusted by the computer system. If the confidence level of the digital character or string of digital characters identified at block 430 is greater than or equal to the threshold confidence level, it may be accepted that the digital character is most likely correct, and the digital character or string of digital characters will be stored at block 450. However, if the confidence level of the digital character or string of digital characters identified at block 430 is less than the threshold confidence level, it may be assumed that the identified character or string of characters may likely incorrectly identify the piece of questionable text.

At block 460, one or more additional digital characters or strings of digital characters may be identified as possible representations of the questionable text. Each of these candidates may have an associated confidence level. Depending on the character or string of characters being analyzed, only one candidate may exist or many candidates may exist. In some instances, the character or string of characters to be identified may so obscured that no candidate may be determined. Whether or not a candidate or candidates may be produced may be based on a candidate threshold confidence level. For example, if a character is identified below a candidate threshold confidence level, it may not be considered a candidate, and therefore, not presented to the user.

At block 470, a candidate or multiple candidates may be presented to a user. The candidates may be in order of confidence level. For example, the candidate with the greatest confidence level may be at the top of the candidate list, with the remainder of candidates listed in descending order by confidence level. In some embodiments, the candidate or candidates are not presented to the user at this point, but rather the possible candidates are stored for presentation to the user after a predetermined amount of text or the entire image has been analyzed.

Following the candidate or candidates being presented to the user at block 470, the user may select a correct candidate at block 480. This may involve the user making a selection of the candidate from a list. The user may also be presented with the image or a portion of the image of the text (containing the questionable text) received at block 410. The questionable text may be in some way highlighted or identified for the user to quickly locate and inspect the questionable text. Such a presentation of the image may allow the user to inspect the image while making a determination as to whether the candidate, or one of the multiple candidates, accurately represents the questionable text. If none of the candidates appear correct, the user may have the ability to enter his or her own digital character or string of digital characters. If a user is unable to identify the questionable text, or for some other reason wants to mark a particular character or string of characters, the user may be able to flag and/or note particular characters for future inspection, evaluation, and/or review.

In some embodiments, the user's selection of a candidate at block 480 may affect the confidence levels of candidates for other pieces of questionable text. For example, if a character or string of characters is identified by the user as being a particular candidate, this may increase the confidence level that a different piece of questionable text is also represented by this particular candidate. For example, consider in FIG. 1 where the majority of data elements in birthdate columns 140 are "Pennsylvania." Due to the frequency of the word, and possibly the user's selection of "Pennsylvania" as the correct candidate for several pieces of questionable text, the confidence level of candidates may be affected by the frequency at which a character or string of characters appears in an image, and/or the frequency at which a user selects the character or string of characters as the correct candidate.

Once a user has identified a candidate as being correct, the selection representing the character or string of characters may be stored at block 490. Whether the characters were stored at block 450 or at block 490, a determination may be made as to whether any more text is present in the image to be evaluated. If there is, the process may return to block 420 and repeat. Alternatively, if no text remains, the process may conclude at block 497. Following block 497, a new image may be received, and the process may begin anew.

Figure 5:
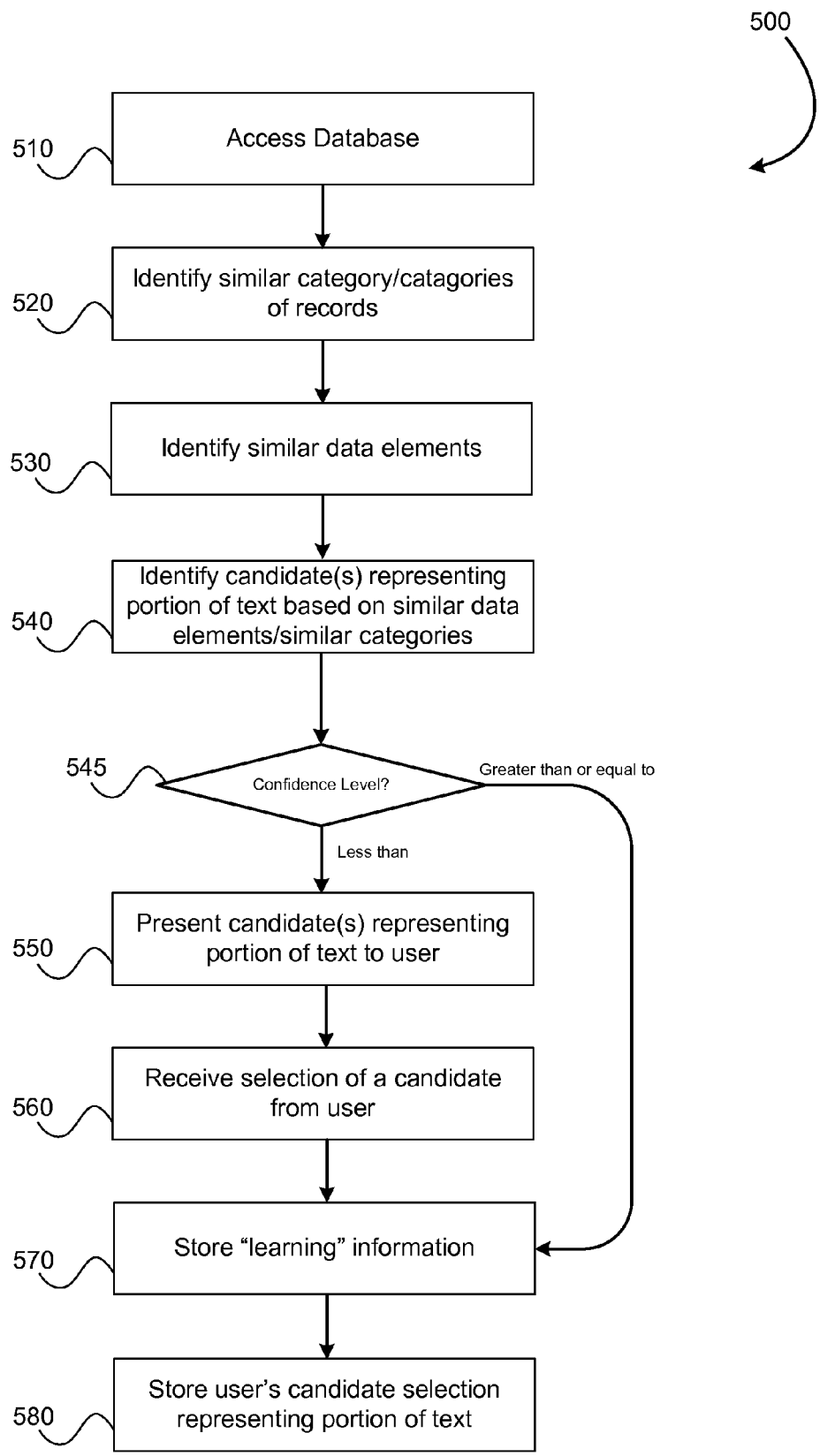
FIG. 5 is a simplified block diagram of an embodiment of a method for digitizing physical documents.

FIG. 5 is another simplified block diagram of an embodiment of a method for digitizing physical documents using a database. Such a method may be incorporated into a method such as method 400 of FIG. 4, and completed using a system such as system 300 of FIG. 3, or some other computer system.

For example, the method 500 of FIG. 5 may be employed after determining that the confidence level of an identified character or string of characters is less than a threshold confidence, level, such as at block 440 of FIG. 4. First, the database may be accessed at block 510. Next, similar categories of records may be identified at block 520. For example, if the image being analyzed is a population schedule, such as the population schedule depicted in FIG. 1, the category or categories of records identified may include: other population schedules from the same county, census, or year, other census documents in general, birth records, death certificates, etc. As a more specific example, it may be useful to compare birth records for Allegheny County Pennsylvania from the early $20^{th}$ century to the population schedule of the 1930. The identification of one or more categories of similar records may be performed by the computer system, may be preset set by the user, or may be determined by the user at the time the image is analyzed. The user may have the ability to add or subtract categories examined.

Following the identification of one or more similar categories, similar data elements may be determined at block 530. Such elements may be identified using a comparison of attributes in records as previously described in relation to database 360 in FIG. 3. For example, consider again the census records 210 of FIG. 2. Data category 440-1 identifies that the data that follows will be the name of a city. Therefore, if the piece of questionable text to be identified follows a data category that calls for the name of a city, similar data elements may be located, such as a "location," "town," or "city" data category in another record.

In some embodiments, as opposed to discrete individual records being stored for individual persons, places, or time periods, information gathered from multiple records may be compiled into the database. Therefore, a record in the database may include a person's name, associated with a birthdate (determined from a birth record), his number of children (from a census record), his address (front a voter registration list) and his date of death (from a death certificate). Therefore, similar data categories and data elements may be searched for among the compiled records.

At block 540, following the data element being identified, candidates may be identified based on similar data elements and similar categories. For example, referring to FIG. 2, this may include "Lowell" being identified as a candidate because another census record (same category), for a man with last name "Korey" born on the same date, and identified a city name (same data element) of "Lowell." Based on this, "Lowell" may at least be a candidate for user selection, or may automatically be selected by the system as the correct text due to a confidence level above the threshold confidence level (block 545).

Assuming that the candidate is not automatically selected, the candidate or candidates may be presented to the user at block 550. If only one candidate is present, the candidate may still be presented to the user for confirmation that the candidate is indeed correct. Any number of candidates may be presented to the user. The user may be able to specify the maximum or minimum number of candidates presented. In other embodiments, the number of candidates presented is determined based on the confidence level. If none of the candidates are correct, the user may have the ability to request more candidates (such as, for example, by lowering the required threshold candidate confidence level for a character or string of characters to be considered a candidate) or may manually enter the correct digital character or string of digital characters. If the user is unable to either manually enter the correct text or select the correct candidate, the user may be able to flag the questionable text for later determination or to note that it was undecipherable.

Once the user has selected the proper candidate (or has chosen another course of action), the selection is received by the computer system at block 560. At block 570, the selection provided by the user may be used as "learning" information to increase the confidence level of other candidates or automatically transcribed text for the particular image currently being evaluated, or for images analyzed in the future. As an example, again referring back to FIG. 1, if the user selected "Pennsylvania" as correct in a first instance where candidates were presented to a user, the confidence level that later instances in this image or in subsequent images that also recite "Pennsylvania" may increase. In some instances, this may result in questionable text, that was previously going to require candidates be presented to a user due to a confidence level below the threshold confidence level, now having a confidence level sufficient to not require the user to select a candidate. In some embodiments, this may result in "Pennsylvania" being prompted among a group of other candidates as being more likely due to an increase in the confidence level.

Further, "learning" information may also include the ability to better recognize text or handwriting appearing within an image based upon candidates chosen by the user. For example, by a user selecting "Pennsylvania," the system may better be able to identify individual characters (that are found with "Pennsylvania") that are repeated in other strings of characters. This "learning" information may be stored in the database, at the computer system, or any computer-readable storage medium.

At block 580, the user's candidate selection representing the portion of the text may be stored. This may include incorporation into a digitized version of the image. The text in the digitized output file may be editable.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for transcribing text from an artifact to an electronic file, the method comprising:
   providing a computer system, wherein the computer system comprises a non-transitory computer-readable storage device;
   receiving, by the computer system, an image of the artifact, wherein text is present on the artifact and the artifact is a census document;
   analyzing, by the computer system, a first portion of the text associated with a data category;
   accessing, by the computer system, a similar content database, wherein
      the similar content database comprises a plurality of records comprised of information identified from a plurality of analyzed artifacts related to the artifact;
   determining, by the computer system, that the artifact is related to a record of the plurality of records;
   using the data category of the record of the plurality of records, identifying, by the computer system, at a first confidence level equal to or greater than a threshold confidence level, characters representing the first portion of the text;
   storing, by the non-transitory computer-readable storage device, the characters representing the first portion of the text;
   analyzing, by the computer system, a second portion of the text appearing on the artifact;
   identifying, by the computer system, at a second confidence level below the threshold confidence level, a plurality of candidates to represent the second portion of the text, wherein at least one candidate of the plurality of candidates to represent the second portion of text is identified based on characters within the record; and
   presenting, by the computer system, the plurality of candidates to a user for selection.

2. The method of claim 1, further comprising:
   receiving, by the computer system, from the user a selection of one of the plurality of candidates to represent the second portion of the text; and
   storing, by the non-transitory computer-readable storage device, the selection.

3. The method of claim 2, further comprising:
   creating, by the computer system, the electronic file comprising the digital characters representing the first portion of the text and the selection.

4. The method of claim 1, wherein the characters may be letters, numbers, punctuation, and/or symbols.

5. The method of claim 1, wherein the record is based on a second census document.

6. A method for transcribing text from a physical document to an electronic document, the method comprising:
   providing a computer system, wherein the computer system comprises a non-transitory computer-readable storage device and a user display;
   receiving, by the computer system, an image of the physical document, wherein: the image comprises imaged text, the text is associated with a data category, and the physical document is a census document;
   accessing, by the computer system, a similar content database, wherein
      the similar content database comprises a plurality of records comprised of information identified from a plurality of analyzed documents related to the physical document;
   determining, by the computer system, that the physical document is related to a record of the plurality of records;
   using the data category of the record of the plurality of records, identifying, by the computer system, a plurality of candidate strings of electronic text to represent portions of the imaged text, wherein a candidate string of electronic text of the plurality of candidate strings of electronic text is identified based on characters within the record;
   presenting, by the computer system, via the user display, the plurality of candidate strings of electronic text and the portion of the text to a user;
   receiving, by the computer system, a selection of one of the candidate strings of digitized text from the user; and
   creating, by the computer system, an electronic document comprising the selection of one of the candidate strings of electronic text from the user.

7. The method of claim 6, further comprising:
   providing, at the computer system, a database, wherein the database comprises electronic text transcribed from physical documents;
   determining, by the computer system, a link between at least one record of the database and the physical document; and
   matching, by the computer system, at least a portion of the at least one record to a portion of imaged text of the physical document.

8. The method of claim 7, wherein the matching is used to identify at least one of the plurality of candidate strings of electronic text to represent portions of the imaged text.

9. The method of claim 7 wherein the at least one record of the database is based on a second census document.

10. The method of claim 7, wherein the link between the at least one record of the database and the physical document is a common person's name.

11. The method of claim 7, wherein the at least one record of the database is based on a second census document.

12. The method of claim 6, further comprising:
   identifying, by the computer system, a string of digitized text to represent a portion of the text;
   determining, by the computer system, a confidence level of the string of text;
   comparing, by the computer system, the confidence level to a threshold confidence level;
   determining, by the computer system, the confidence level meets or exceeds the threshold confidence level;
   storing, by the computer system, the string of text as part of the electronic document.

13. A non-transitory computer-readable storage medium for transcribing text appearing in imaged documents to an electronic file, comprising processor-readable instructions configured to cause a processor to:
   receive an image of a document, wherein text appears on the document and the document is a census document;
   analyze the text appearing in the image of the document;
   identify questionable text, wherein the questionable text is identified at a confidence level less than a threshold confidence level and the text is associated with a data category;
   access a similar content database, wherein the similar content database comprises a plurality of records comprised of information identified from a plurality of analyzed documents;

determine that the document is related to a record of the plurality of records;

analyze the related record to identify a string of candidate text associated with the data category from the related record as a replacement for at least a portion of the questionable text;

cause the string of candidate text to be presented as a choice for replacement of the questionable text to a user, wherein the string of candidate text is identified based on the related record;

receive a selection of the choice for replacement from the user;

replace the unidentified text with the string of candidate text; and store the string of candidate text in a digitized document.

14. The non-transitory computer-readable storage medium of claim 13, further comprising processor-readable instructions configured to cause the processor to:

transcribe text from the image of the document, wherein the text is transcribed at a confidence level equal to or greater than the threshold confidence level; and store transcribed text in the electronic document.

15. The non-transitory computer-readable storage medium of claim 14, wherein the threshold confidence level is configurable by the user.

16. The non-transitory computer-readable storage medium of claim 13, wherein the related record is determined based upon a common data element of the related record and the document selected from the group consisting of:

a name of a person;
a date of birth of the person;
a date of death of the person;
a relative of the person;
a location;
an address; and
a social security number.

17. The non-transitory computer-readable storage medium of claim 16, wherein the related record is selected from the group consisting of:

census documents;
birth certificates;
death certificates;
marriage licenses; and
immigration records.

* * * * *